UNITED STATES PATENT OFFICE.

GERHARD NICOLAAS VIS, OF PARIS, FRANCE.

PROCESS FOR TRANSFORMING FREE OR COMBINED AMMONIA INTO AMMONIUM SULFATE.

1,366,301.     Specification of Letters Patent.     Patented Jan. 18, 1921.

No Drawing.     Application filed October 25, 1918. Serial No. 259,681.

*To all whom it may concern:*

Be it known that I, GERHARD NICOLAAS VIS, of 10 Rue de Vienne, Paris, France, chemist, have invented a new and useful Improved Process for Transforming Free or Combined Ammonia into Ammonium Sulfate, which process is fully set forth in the following specification.

It is known that the ammonia contained in gases from coke ovens or from gas works and other gases, is in a state of extreme dilution and that the fixing of the ammonia present whether in the form of free ammonia, of carbonate, or hydrosulfid or other form, takes place easily either by absorption in sulfuric acid which transforms practically all the ammonia into ammonium sulfate, or by absorption in water with the production of crude ammoniacal liquors which are subsequently transformed into ammonium sulfate by the aid of lime and sulfuric acid.

This invention has for its object to replace the sulfuric acid with a product of less commercial value.

According to this invention sodium bisulfate is employed for this purpose.

The sodium bisulfate is employed either in the solid state in the presence of a quantity of water insufficient to dissolve it completely or in a more or less concentrated solution.

The absorption of the ammonia takes place as if sulfuric acid were employed, but the resulting product consists of ammonium sulfate and sodium sulfate in about equimolecular proportion according to the composition of the sodium bisulfate employed. These two products form a double salt:

$$(NH_4)_2SO_4.Na_2SO_4.4H_2O$$

which crystallizes very easily and which is of no commercial value.

According to this invention the salt is transformed into chemically or commercially pure ammonium sulfate and sodium sulfate.

The separation of sodium sulfate and ammonium sulfate starting from their equimolecular or nearly equi-molecular mixture takes place as hereinafter described.

The method is based upon the relatively small solubility of sodium sulfate $$Na_2SO_4.10H_2O$$

at low temperature, that is, near 0° C.

The solution of the double salt is so diluted that there are present about 15 kgs. of sodium sulfate, $Na_2SO_4$, to 100 kgs. of water; this diluted solution is then cooled to about 0° C. About two thirds of the sodium sulfate present, that is, nearly 10 kgs. separates out as the salt $Na_2SO_4.10H_2O$, which is recovered in a filter press, centrifugal machine, or by other suitable means; all the ammonium sulfate on the contrary remains in solution and is separated by concentrating the mother liquor by heating or is crystallized by cold and then separated in a centrifugal machine or other analogous means. The mother liquors resulting from this latter operation are again treated as above described.

Claims:

1. A process for transforming free or combined ammonia mixed with inert gas or steam into ammonium sulfate which consists in absorbing the ammonia by the aid of sodium bisulfate substantially free from uncombined sulfuric acid to obtain a double salt of sodium sulfate and ammonium sulfate, and decomposing the double salt by diluting the product and refrigerating the mixture to obtain crystalline $Na_2SO_4.10H_2O$.

2. A process for transforming free or combined ammonia mixed with inert gas or steam into ammonium sulfate which consists in subjecting the gases containing ammonia to the action of sodium bisulfate to form a double sulfate of sodium and ammonium, preparing an aqueous solution therefrom containing in 100 parts of water substantially 15 parts of sodium sulfate, cooling the solution to about 0° C. to decompose the double salt, separating the crystalline sodium sulfate from said solution and concentrating the latter to separate the ammonium sulfate.

In testimony whereof I have signed this specification.

GERHARD NICOLAAS VIS.

Witnesses:
JOHN F. SIMONS,
GASTON DE MESTRAL.